(12) United States Patent
Jeong (10) Patent No.: US 9,499,078 B2
(45) Date of Patent: Nov. 22, 2016

(54) HEADREST MOVING DEVICE

(71) Applicant: WOOBO TECH CO., LTD., Pyeongtaek-si, Gyeonggi-do (KR)

(72) Inventor: Hae Il Jeong, Incheon (KR)

(73) Assignee: Woobo Tech Co., Ltd., Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/767,172

(22) PCT Filed: Dec. 3, 2014

(86) PCT No.: PCT/KR2014/011775
§ 371 (c)(1),
(2) Date: Aug. 11, 2015

(87) PCT Pub. No.: WO2015/088177
PCT Pub. Date: Jun. 18, 2015

(65) Prior Publication Data
US 2015/0375649 A1    Dec. 31, 2015

(30) Foreign Application Priority Data

Dec. 10, 2013  (KR) .......................... 10-2013-0152809

(51) Int. Cl.
*B60N 2/48*       (2006.01)
*A47C 7/38*       (2006.01)

(52) U.S. Cl.
CPC ............... *B60N 2/4847* (2013.01); *A47C 7/38* (2013.01); *B60N 2/4852* (2013.01)

(58) Field of Classification Search
CPC  B60N 2/4847; B60N 2/4852; B60N 2/4841; B60N 2/4838; B60N 2/4829; A47C 7/38

USPC .................................................. 297/366, 373
See application file for complete search history.

(56) References Cited

U.S. PATENT DOCUMENTS

| 6,926,363 B2 * | 8/2005 | Yamashita | ............ A47C 1/026 16/321 |
| 7,455,363 B2 | 11/2008 | Chung | .......................... 297/407 |

(Continued)

FOREIGN PATENT DOCUMENTS

| JP | 2000-342379 | 12/2000 | ............... A47C 7/38 |
| JP | 2006-523497 | 10/2006 | ............... A74C 7/38 |

(Continued)

OTHER PUBLICATIONS

Korean Intellectual Property Office, Office Action: Notification of Grounds for Rejection—Application No. 10-2013-0152809, dated Sep. 10, 2015, 3 pages.

(Continued)

*Primary Examiner* — Milton Nelson, Jr.
(74) *Attorney, Agent, or Firm* — Sunstein Kann Murphy & Timbers LLP (57) ABSTRACT

Provided is a headrest moving device. When first and second gears, each of which has numerous teeth formed in widthwise and lengthwise directions, are engaged, the numerous widthwise teeth are engaged, and the numerous lengthwise teeth are engaged. Due to the teeth, it is possible to minutely adjust a position of a headrest and to withstand a high load. Even when some of the teeth are disengaged, the headrest moving device can be operated and provides excellent durability.

1 Claim, 9 Drawing Sheets

(56) References Cited

U.S. PATENT DOCUMENTS

| | | | |
|---|---|---|---|
| 2011/0175421 A1* | 7/2011 | Grable | B60N 2/4847 297/408 |
| 2011/0221250 A1 | 9/2011 | Little | 297/408 |
| 2014/0125109 A1 | 5/2014 | Schwarzbich | 297/463.1 |

FOREIGN PATENT DOCUMENTS

| | | | | |
|---|---|---|---|---|
| JP | 2012-0162123 | 8/2012 | | A47C 7/38 |
| KR | 2000-0015501 | 8/2000 | | B60N 2/48 |
| KR | 10-0403478 | 10/2003 | | B60N 2/48 |
| KR | 10-592788 | 9/2005 | | B60N 2/48 |
| KR | 2007-0105210 | 10/2007 | | B60N 2/48 |
| KR | 10-0790535 | 1/2008 | | B60N 2/48 |
| KR | 10-0930033 | 12/2009 | | B60N 2/48 |
| WO | WO 2012/175371 A1 | 12/2012 | | B60N 2/02 |

OTHER PUBLICATIONS

Korean Intellectual Property Office, Office Action: Notification of Grounds for Rejection—Application No. 10-2013-0152809, dated Sep. 10, 2015, 3 pages. (English translation).

International Searching Authority, International Search Report—International Application No. PCT/KR2014/011775, dated Mar. 16, 2015, 2 pages.

Japanese Patent Office, Office Action: Notice of Reasons for Refusal—Application No. 2015-560133, dated Jun. 3, 2016, 3 pages.

Japanese Patent Office, Office Action: Notice of Reasons for Refusal—Application No. 2015-560133, dated Jun. 3, 2016, 2 pages. (English Translation).

* cited by examiner

HEADREST MOVING DEVICE

TECHNICAL FIELD

This invention relates generally to a headrest moving device and, more particularly, to a headrest moving device in which, when first and second gears, each of which has numerous teeth formed in widthwise and lengthwise directions, are engaged, the numerous widthwise teeth are engaged, and the numerous lengthwise teeth are engaged, thereby making it possible to minutely adjust a position of a headrest due to the numerous teeth, to withstand a high load, to precisely form the teeth to provide a compact structure and improved operability, to be operated even when some of the teeth are disengaged, and to provide excellent durability.

BACKGROUND ART

A prior art headrest moving device is coupled to a headrest having a tilting and sliding structure capable of freely adjusting a distance from the head of a driver or passenger by rotating the headrest around a fixed fulcrum at a desired angle with the headrest fixed to a backrest.

As disclosed in Korean Patent No. 10-790535, Korean Unexamined Utility Model Application Publication No. 20-2000, Korean Patent No. 10-403478, Korean Unexamined Patent Application Publication No. 10-2007-0105210, and US Patent Application Publication No. 2011-0221250, when the sliding or tilting structure of the headrest is applied, a position of the headrest is adjusted by numerous teeth formed in a lengthwise direction. When the teeth are reduced in size in order to minutely adjust the position of the headrest, durability of the teeth is reduced, and the teeth are easily damaged. Further, when some of the teeth are disengaged, the headrest moving device is not operated.

SUMMARY OF INVENTION

Technical Problem

The present invention has been made to solve the above problems, and an object of the present invention is to provide a headrest moving device capable of minutely adjusting a position of a headrest, withstanding a high load, being operated even when some of the teeth are disengaged, and providing excellent durability.

Solution to Problem

To achieve the object, there is provided a headrest moving device that includes: a first gear having numerous teeth formed in widthwise and lengthwise directions; and a second gear having numerous teeth formed in the widthwise and lengthwise directions. One of the first and second gears is connected to a seat, and the other is connected to a headrest. When the first and second gears are engaged, the numerous widthwise teeth are engaged, and the numerous lengthwise teeth are engaged.

Here, at least one of the first and second gears may include multiple plates, each of which has the numerous teeth formed in the lengthwise direction and which are coupled to form rows of the teeth in the widthwise and lengthwise directions.

Further, the headrest moving device may further include a first link connected to the seat, a second link pivotably installed on one side of the first link, a third link pivotably installed on the other side of the first link, and a fourth link, one side of which is pivotably connected to the second link, and the other side of which is pivotably connected to the third link. The headrest may be connected to the fourth link. The first gear may be connected to the first link, and the second gear may be connected to the second link.

In addition, the headrest moving device may further include a first bracket installed on a horizontal rod connected to the seat, and a second bracket that is pivotably installed on the horizontal rod and is connected to the headrest. The first gear may be pivotably installed on the first bracket, and the second gear may be installed on the second bracket. The first bracket and the first gear may be connected to opposite ends of a spring that keeps the first and second gears engaged or disengaged.

Advantageous Effects of Invention

As described above, the headrest moving device of the present invention has the following effects.

When first and second gears having numerous teeth formed in widthwise and lengthwise directions are engaged, the numerous widthwise teeth are engaged, and the numerous lengthwise teeth are engaged. As such, even when the teeth are formed in a very small size (the numerous widthwise/lengthwise small teeth are engaged), the teeth can withstand a high load, and a position of the headrest can be more precisely adjusted in a multistage way to the maximum extent. For example, the prior art can adjust the headrest to three stages only, but the present invention can very minutely adjust the headrest to nine or more stages.

Further, since the teeth can be formed in a small size, the headrest moving device is made compact and is improved in operability.

Further, even when some of the teeth are disengaged, the headrest moving device can be operated to provide excellent durability.

At least one of the first and second gears includes multiple plates, each of which has the numerous teeth formed in the lengthwise direction and which are coupled to form rows of the teeth in the widthwise and lengthwise directions. Thus, when assembled, the plates need not be maintained at accurate positions, and are easily assembled. Even when some of the teeth are disengaged, only the plate having damaged teeth has only to be replaced, and expenses for maintenance are reduced. Further, the prior art has a complicated process because the gear is machined by casting or forging and then finishing. However, the present invention has a simplified process because the gear is machined by pressing the plate.

Further, the headrest moving device further includes a first link connected to the seat, a second link pivotably installed on one side of the first link, a third link pivotably installed on the other side of the first link, and a fourth link, one side of which is pivotably connected to the second link, and the other side of which is pivotably connected to the third link. The headrest is connected to the fourth link. Further, the first gear is connected to the first link, and the second gear is connected to the second link. Thereby, the headrest is minutely slid in a forward/backward direction, and a position thereof can be adjusted.

The headrest moving device further includes a first bracket installed on a horizontal rod connected to the seat, and a second bracket that is pivotably installed on the horizontal rod and is connected to the headrest. The first gear is pivotably installed on the first bracket, and the second gear is installed on the second bracket. Further, the first bracket and the first gear are connected to opposite ends of a spring that keeps the first and second gears engaged or disengaged. Thereby, the headrest is minutely tilted in a forward/backward direction, and a position thereof can be adjusted.

DETAILED DESCRIPTION OF EMBODIMENT

Hereinafter, exemplary embodiments of the present invention will be described in detail with reference to the accompanying drawings.

For reference, among components of the present invention which will be described below, the same components as in the prior art refer to the aforementioned prior art, and detailed description thereof will be omitted.

First Embodiment

As illustrated in FIGS. 1 to 10, a headrest moving device of the present embodiment includes a first gear 100 having numerous teeth 150 formed in widthwise and lengthwise directions, and a second gear 200 having numerous teeth 240 formed in the widthwise and lengthwise directions, wherein the first and second gears 100 and 200 are configured such that one is connected to a seat and the other is connected to a headrest, and when the first and second gears 100 and 200 are engaged, the numerous widthwise teeth 150 and 240 are engaged, and the numerous lengthwise teeth 150 and 240 are engaged.

Figure 2:
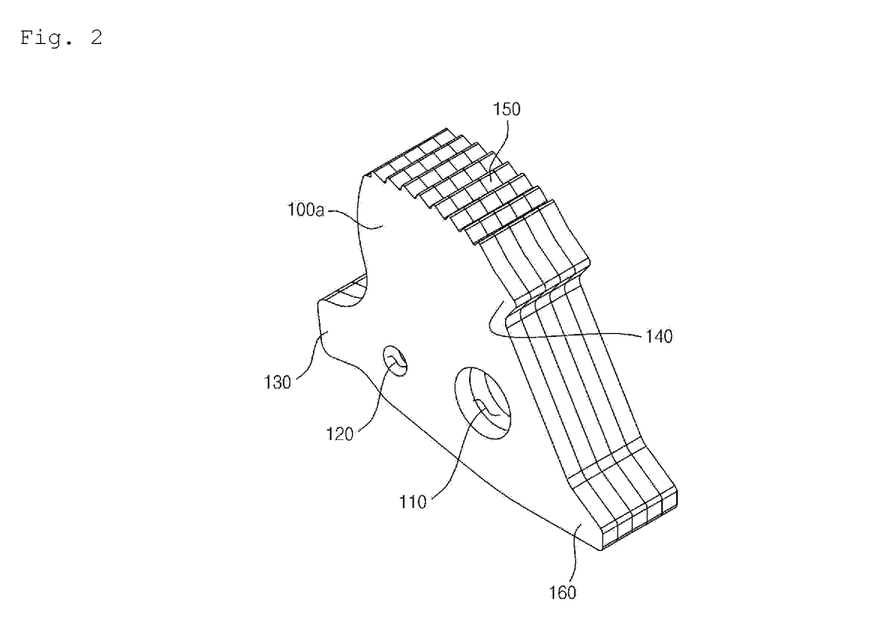
FIG. 2 is a perspective view of a first gear of FIG. 1.

The first gear 100 is vertically disposed in a forward/backward direction, and is formed in a plate shape. The numerous teeth 150 are formed on the top of the first gear 100 in the widthwise and lengthwise directions.

The first gear 100 is installed on a first link 300 to be described below, and is connected to the seat.

The first gear 100 is configured such that multiple plates 100a having the numerous teeth 150 formed in the lengthwise direction, are coupled in the widthwise direction. Thus, the numerous teeth 150 of the first gear 100 are formed in the widthwise direction.

The first gear 100 is provided with a first protrusion 130 at a front lower portion thereof, and a fastening hole 110 in a rear lower portion thereof which is penetrated in the widthwise direction.

The first gear 100 is provided with a spring mounting hole 120 in a lower portion thereof so as to be disposed in front of the fastening hole 110.

The first gear 100 is provided with a first catch 140 at a rear upper portion thereof. The first catch 140 protrudes backwards so as to be disposed in the rear of the teeth 150.

Further, the first gear 100 is provided with a second protrusion 160 at the rear lower portion thereof which protrudes backwards. A stopper 304 of the first link 300 to be described below is disposed below the second protrusion 160.

Figure 3:
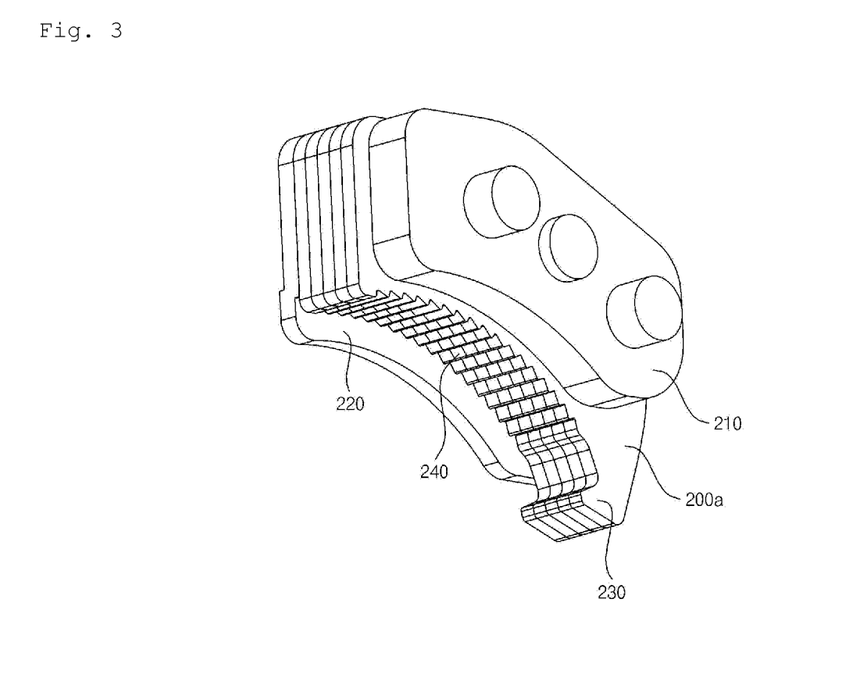
FIG. 3 is a perspective view of a second gear of FIG. 1.

The second gear 200 is vertically disposed in a forward/backward direction, and is formed in a plate shape. The numerous teeth 240 are formed on the bottom of the second gear 200 in the widthwise and lengthwise directions.

The teeth 150 and 240 of the first and second gears 100 and 200 are adapted to allow movement in one direction (or in a forward direction) but not in the opposite direction (or in a backward direction).

The second gear 200 is installed on a second link 400 to be described below, and is connected to the backrest.

The second gear 200 is configured such that multiple plates 200a having the numerous teeth 240 formed in the lengthwise direction are coupled in the widthwise direction. Thus, the numerous teeth 240 of the second gear 200 are formed in the widthwise direction.

The teeth 240 formed in the lengthwise direction have an arcuate shape.

A guide plate 220 is installed on the left side of the second gear 200, and an auxiliary plate 210 is installed on the right side of the second gear 200. The second gear 200, the guide plate 220, and the auxiliary plate 210 are each provided with fastening holes, and are installed on a second link 400.

The guide plate 220 is installed to protrude downward relative to the plates 200a, and guides the first gear 100 engaged with the second gear 200.

The auxiliary plate 210 is disposed between the second link 400 and the second gear 200, and adjusts a separation distance between the second link 400 and the second gear 200.

Figure 1:
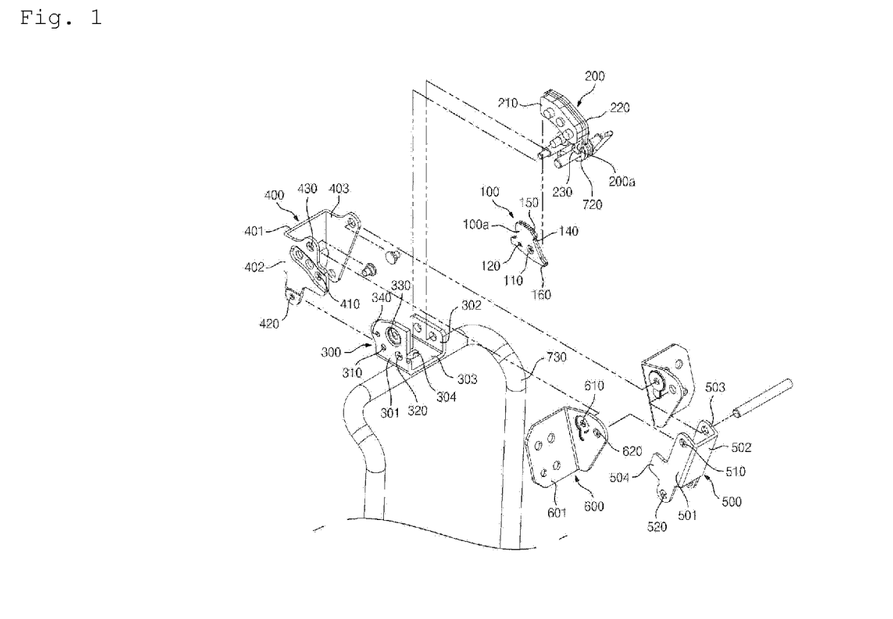
FIG. 1 is a perspective view of a headrest moving device according to a first embodiment of the present invention.

The first link 300 is installed in the middle of a horizontal rod of a stay rod 730 connected to the seat, and is connected to the seat.

The first link 300 includes sidewalls 301 and 302 that are vertically disposed on opposite sides thereof, and a bottom plate 303 that connects lower ends of the sidewalls 301 and 302 and is installed on the horizontal rod.

The sidewalls 301 and 302 are each provided with fastening holes 310 and 320 that are penetrated in the widthwise direction. The fastening holes 310 and 320 are disposed in the front and rear of each sidewall, respectively.

The sidewall 301 disposed on the right side is provided with a first gear fastening hole 330 penetrated in the widthwise direction so as to be disposed above the fastening holes 310 and 320. A shaft is inserted into the first gear fastening hole 330 and the fastening hole 110 of the first gear 100, and the first gear 100 is pivotably installed on the first link 300.

The sidewall 301 is provided with a spring mounting hole 340 so as to be disposed above the fastening holes 310 and 320 and in front of the first gear fastening hole 330.

The stopper 304 is formed in the rear of the sidewall 301 so as to protrude backward, and is disposed below the first gear fastening hole 330.

The second gear 200 is installed on one side (or in the front) of the first link 300 so as to be pivotable around a shaft.

The second link 400 includes a front plate 401, and sidewalls 402 and 403 formed on opposite sides of the front plate 401.

The sidewalls 402 and 403 are each provided with fastening holes 430 and 420 in upper and lower portions thereof. A shaft is inserted into the fastening hole 420, and the second link 400 is connected to the first link 300 so as to be pivotable along with fourth links 600. The fastening holes 430 and 420 are crossed such that the fastening hole 420 located at the lower portion is disposed in front.

The sidewall 402 disposed on the right side is provided with a plurality of second gear fastening holes 410 in a forward/backward direction so as to be disposed between the fastening holes 430 and 420. The sidewall 402 is provided with a recess in an outer surface thereof so as to communicate with the second gear fastening holes 410. The recess is formed in such a manner that a part of the sidewall 402 is curved inside.

Fasteners such as bolts are fitted into the fastening holes formed in the second gear 200 and the second gear fastening holes 410, and thus the second gear 200 is fixedly installed on the second link 400.

A third link 500 is pivotably installed on the other side (or in the rear) of the first link 300.

The third link 500 includes a rear plate 502 and sidewalls 501 and 503 formed on opposite sides of the rear plate 502.

The sidewall 501 disposed on the right side is provided with a protruding plate 504 at a front lower portion thereof.

The sidewalls 501 and 503 are each provided with fastening holes 510 and 520 in upper and lower portions thereof.

The third link 500 is obliquely disposed such that the fastening hole 520 located at the lower portion is disposed in front.

Shafts are fitted into the fastening holes 510 and 520, and the third link 500 is pivotably connected to the first and fourth links 300 and 400.

One side (or the front) of each fourth link 600 is pivotably connected to the second link 400, and the other side (or the rear) of each fourth link 600 is pivotably connected to the third link 500.

The fourth links 600 are disposed on respective opposite sides of the headrest moving device.

Each fourth link 600 includes a lateral plate 602 and an installing plate 601 that is bent outward in the front of the lateral plate 602.

The headrest is installed on the installing plates 601.

Each lateral plate 602 is provided with fastening holes 610 and 620 in the front and rear thereof, respectively.

The shafts are fitted into the fastening holes 610 and 620, and the front and rear of each fourth link 600 are pivotably installed on the second link 400 and the third link 500.

Opposite ends of a spring 710 are fitted (connected) into the spring mounting holes 120 and 340 of the first gear 100 and the first link 300, respectively. Thus, the spring 710 keeps the first and second gears 100 and 200 engaged or disengaged. In detail, the spring 710 is formed in an omega shape. When the first and second gears 100 and 200 are in an engaged state, the spring 710 applies an elastic force to the first gear 100 such that the engaged state is maintained. When the first and second gears 100 and 200 are in a disengaged state, the spring 710 applies an elastic force to the first gear 100 such that the disengaged state is maintained.

Furthermore, if a separate force is not applied to the headrest when the first and second gears 100 and 200 are in the disengaged state, the headrest automatically moves backwards (or returns to its original position). To this end, a main spring 720 is provided.

The main spring 720 is fitted around the shaft connecting the first link 300 and the third link 500, and opposite ends thereof are connected to the first link 300 and the third link 500.

Hereinafter, an operation of the present embodiment having the aforementioned configuration will be described.

Figure 4:
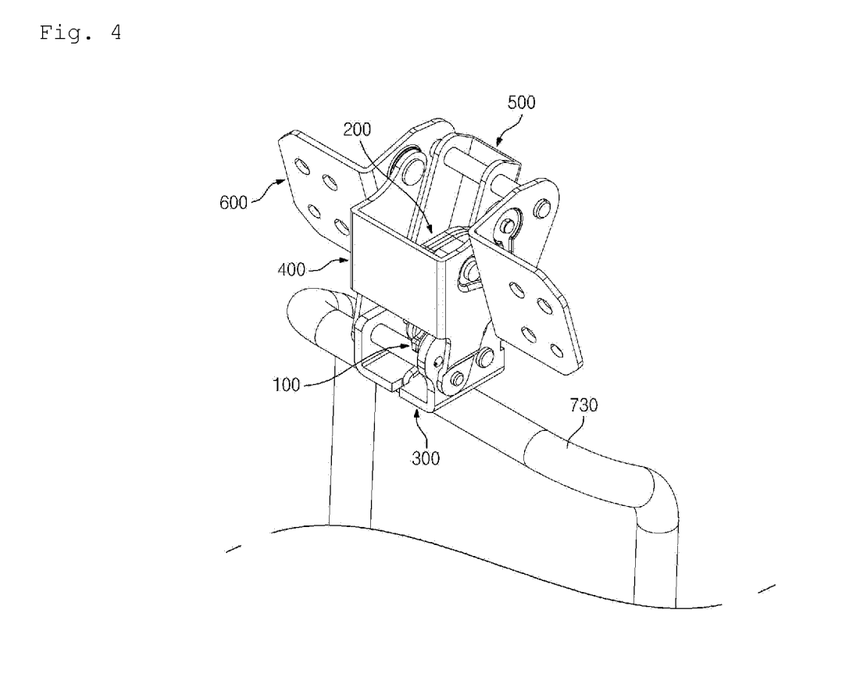
FIG. 4 is an assembled perspective view of the headrest moving device of FIG. 1.
Figure 5:
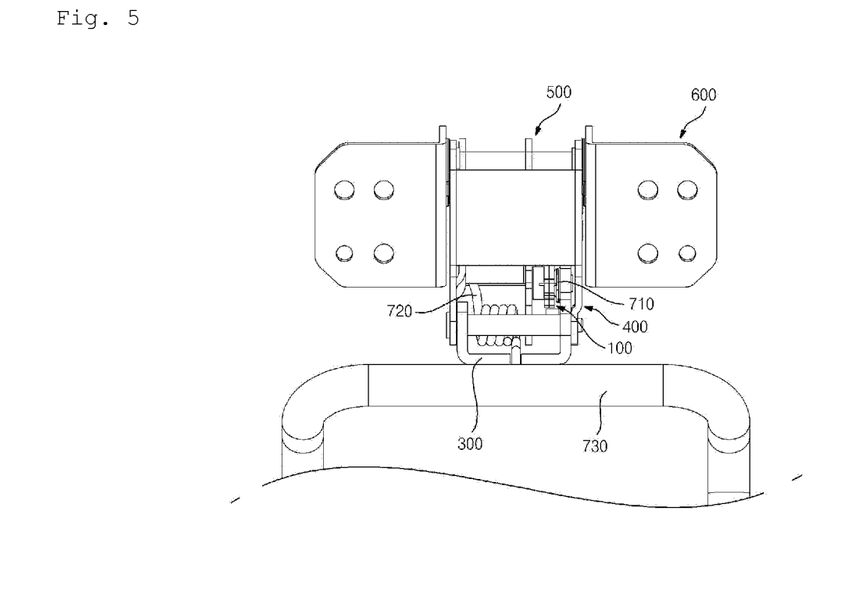
FIG. 5 is a front view of FIG. 4.
Figure 6:
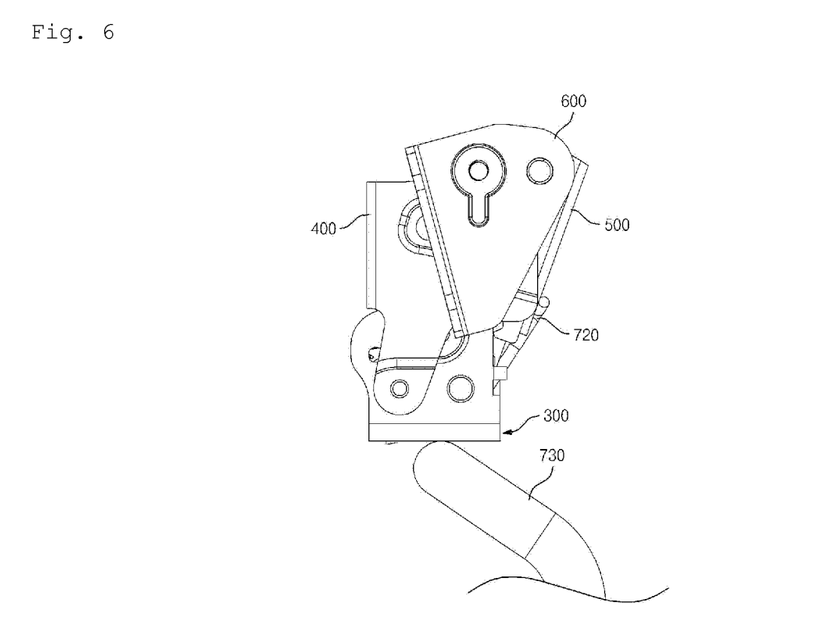
FIG. 6 is a side view of FIG. 4.
Figure 7:
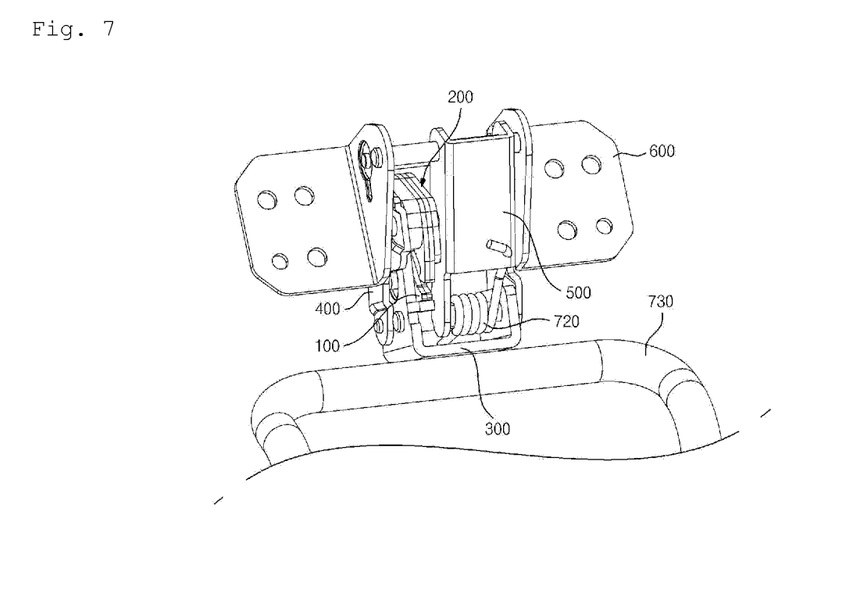
FIG. 7 is a rear perspective view of FIG. 4.
Figure 8:
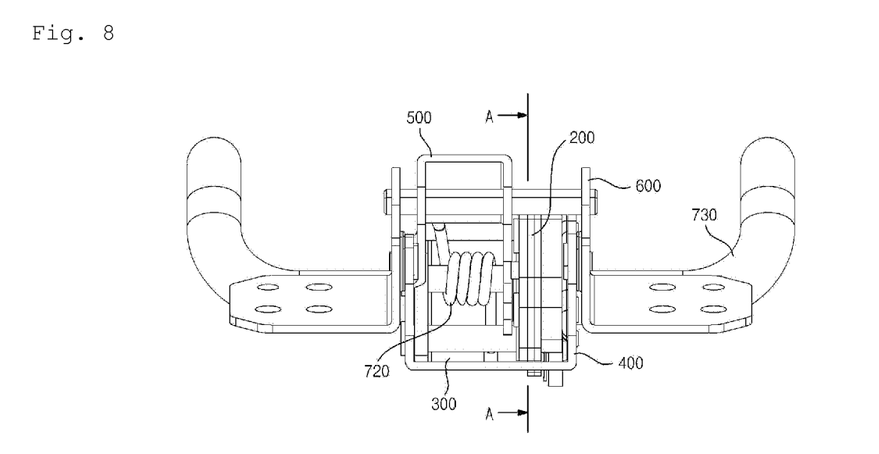
FIG. 8 is a plan view of FIG. 4.
Figure 9:
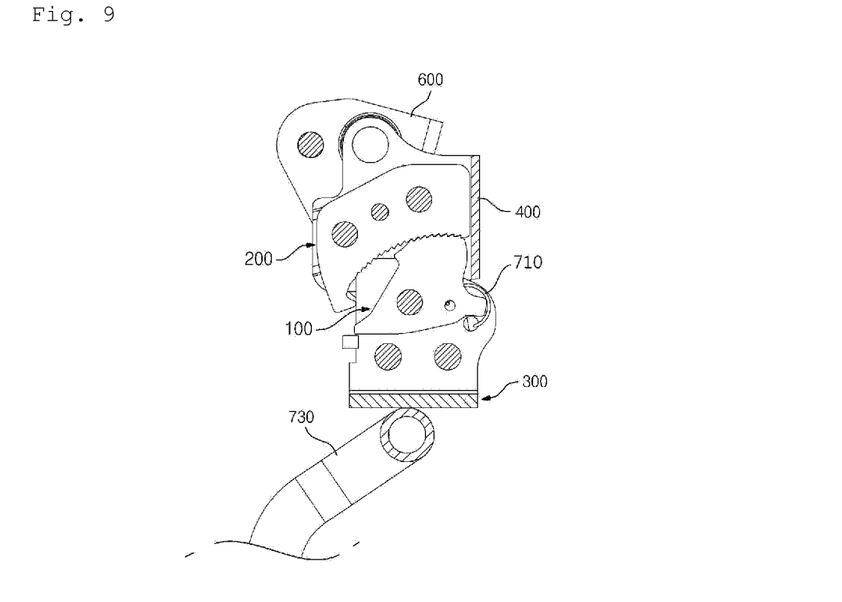
FIG. 9 is a cross-sectional view taken along line a-a of FIG. 8.

When a user pushes forward the headrest in order to slide the headrest in a forward direction, the headrest (the second gear and the second, third, and fourth links) slides forward relative to the stay rod 730 (the first gear and the first link), because the teeth 150 and 240 are formed to allow the second gear 200 to move forward relative to the first gear 100. When the user removes a force pushing forward the headrest when the headrest reaches a desired position, the first and second gears 100 and 200 are engaged, and the engaged state is stably maintained by the spring 710. Thus, a position of the headrest is fixed.

In this way, when the first and second gears 100 and 200 are engaged, the numerous widthwise teeth 150 and 240 are engaged with each other, and the numerous lengthwise teeth 150 and 240 are engaged with each other.

For this reason, even when any row of numerous widthwise teeth 150 and 240 are disengaged with each other, the other rows of widthwise teeth 150 and 240 are engaged, and thus the engaged state is stably maintained. Further, when engaged, multiple widthwise teeth 150 and 240 and the multiple lengthwise teeth 150 and 240 are simultaneously engaged, and thus durability can be maintained under high load.

Figure 10:
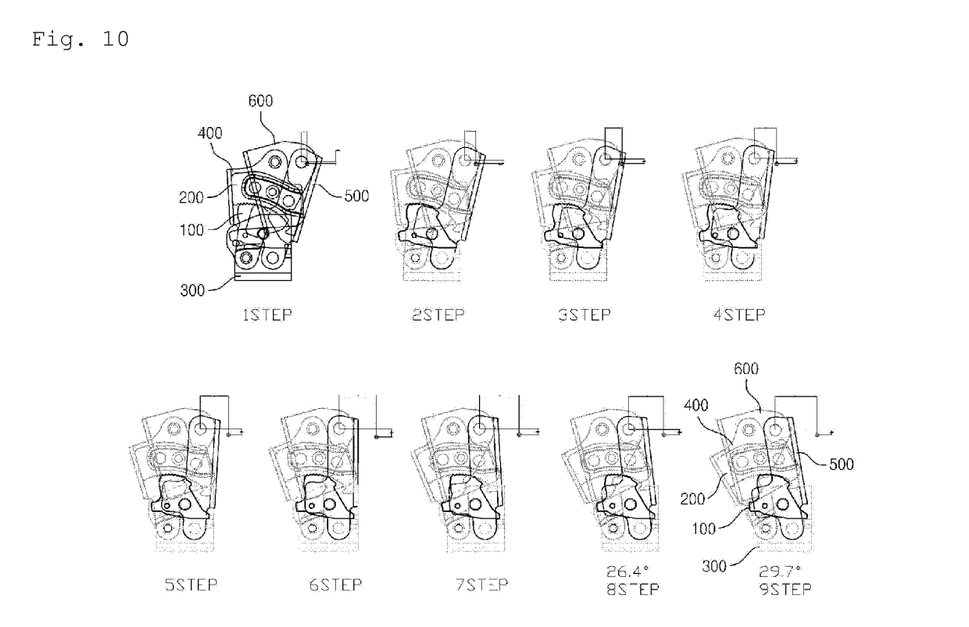
FIG. 10 illustrates an operation of the headrest moving device according to the first embodiment of the present invention.

Further, as illustrated in FIG. 10, a front/rear position of the headrest can be minutely adjusted (from a first step to a ninth step) by the numerous lengthwise teeth 150 and 240.

When the user pushes the headrest to the foremost position in order to move the headrest in a backward direction, the first catch 140 of the first gear 100 is caught on the second catch 230 of the second gear 200, and the first gear 100 is turned. Thereby, the first gear 100 is disengaged from the second gear 200. The disengaged state of the first and second gears 100 and 200 is maintained by the spring 710. As such, the headrest including the second link 400, the second gear 200, the third link 500, and the fourth links 600 moves backward relative to the stay rod 730 including the first link 300 and the first gear 100 due to an elastic force of the main spring 720. Subsequently, when the headrest moves to the rearmost position, the first and second gears 100 and 200 are caught on the front plate 401 of the second link 400, and the first gear 100 is engaged with the front of the second gear 200.

In this way, when the position of the headrest is fixed, the two gears are engaged. When the headrest is intended to move backward, the user moves the headrest to the foremost position and removes the force. Thereby, the headrest automatically moves to the rearmost position. A headrest moving device equipped with a spring keeping two gears engaged and disengaged is disclosed in the prior art, and detailed description thereof will be omitted.

Second Embodiment

Unlike the first embodiment above, as illustrated in FIGS. 11 to 16, a headrest moving device according to a second embodiment further includes a first bracket 900 that is installed on a horizontal rod of a stay rod 730' connected to the seat, and a second bracket 800 that is pivotably installed on the horizontal rod and is connected to the headrest. The first gear 100' is pivotably installed on the first bracket 900, and the second gear 200' is installed on the second bracket 800. Opposite ends of a spring 710' are connected to the first bracket 900 and the first gear 100', respectively. The spring 710' keeps the first and second gears 100' and 200' engaged or disengaged.

Detailed description of the same components as in the aforementioned embodiment will be omitted.

Figure 11:
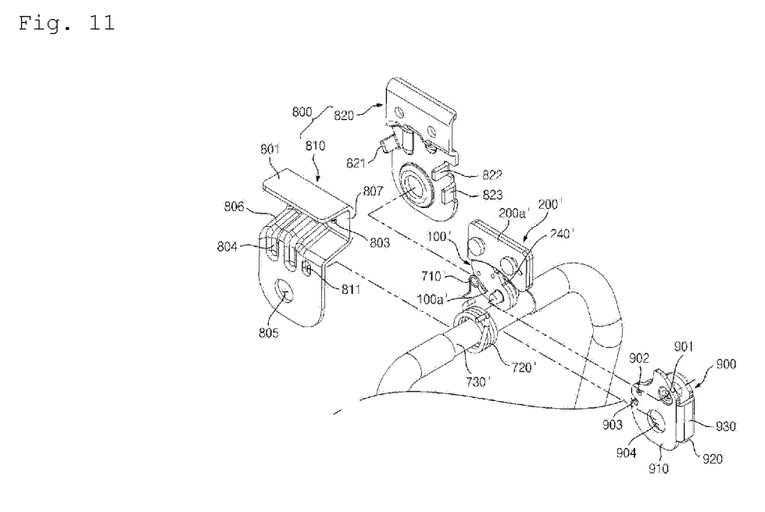
FIG. 11 is a perspective view of a headrest moving device according to a second embodiment of the present invention.

The first gear 100' has numerous teeth 150' formed on the top thereof in a forward/backward direction and in a widthwise direction. The first gear 100' is provided with a first catch 140' protruding upward in the rear of the teeth 150'.

The first gear 100' is provided with coupling holes in the front and rear of an upper portion thereof such that multiple plates 100a' can be coupled to each other.

The first gear 100' is provided with a fastening hole into which a shaft is inserted and is located below the coupling holes.

The first gear 100' is provided with a spring mounting hole into which one end of the spring 710' is fitted so as to be disposed in front of the fastening hole.

The second gear 200' includes multiple plates 200a' coupled to each other. The second gear 200' is provided with fastening holes so as to be fixed to the second bracket 800.

The second gear 200' is provided with numerous teeth 240' on the bottom thereof in the forward/backward direction and in the widthwise direction.

The first bracket 900 includes sidewalls 910 and 920 that are vertically disposed on opposite sides thereof in the forward/backward direction, and a rear plate 930 that connects rear ends of the sidewalls 910 and 920.

Each of the sidewalls 910 and 920 is provided with a first gear fastening hole 901 in an upper portion thereof in the widthwise direction. A shaft passing through the first gear 100' is installed in the first gear fastening hole 901, and the first gear 100' is pivotably installed in the first bracket 900.

Each of the sidewalls 910 and 920 is provided with a through-hole 904 through which the horizontal rod passes in a lower portion thereof, and the first bracket 900 is fixed to the horizontal rod. Thus, the first bracket 900 is connected to the seat.

The first bracket 900 is disposed on a left side of the main spring 720' fitted around the middle of the horizontal rod.

A spring mounting hole 902 into which the other end of the spring 710' is fitted is formed in a front upper portion of the sidewall 910 disposed on the right side.

Further, a main spring mounting slot 903 into which one end of the main spring 720' is fitted is formed in a front lower portion of the sidewall 910.

The second bracket 800 includes sidewalls 810 and 820 that are vertically disposed on opposite sides thereof in the forward/backward direction.

Each of the sidewalls 810 and 820 is provided with a through-hole 805 through which the horizontal rod passes in a lower portion thereof. The second bracket 800 is pivotable relative to the stay rod 730', the first bracket 900, and the first gear 100'.

The sidewall 810 disposed on the right side is provided with a main spring mounting hole 811 into which the other end of the main spring 720' is fitted The sidewall 810 is provided with a first bend 806 that is bent inwards at an intermediate portion thereof, a second bend 807 that is bent upward at an end of the first bend 806, and a third bend 801 that is bent outwards at an upper end of the second bend 807.

The intermediate portion of the sidewall 810 and the first bend 806 is provided with a corrugation 804 that is formed in a waveform so as to improve durability.

The second bend 807 is provided with fastening holes 803 in the front and rear thereof in the widthwise direction such that the second gear 200' can be installed and the opposite sidewalls 810 and 820 are coupled to each other. Thus, the second gear 200' is fixedly installed on the second bracket 800.

Due to the third bend 801, the headrest can be stably connected to the second bracket 800.

Figure 15:
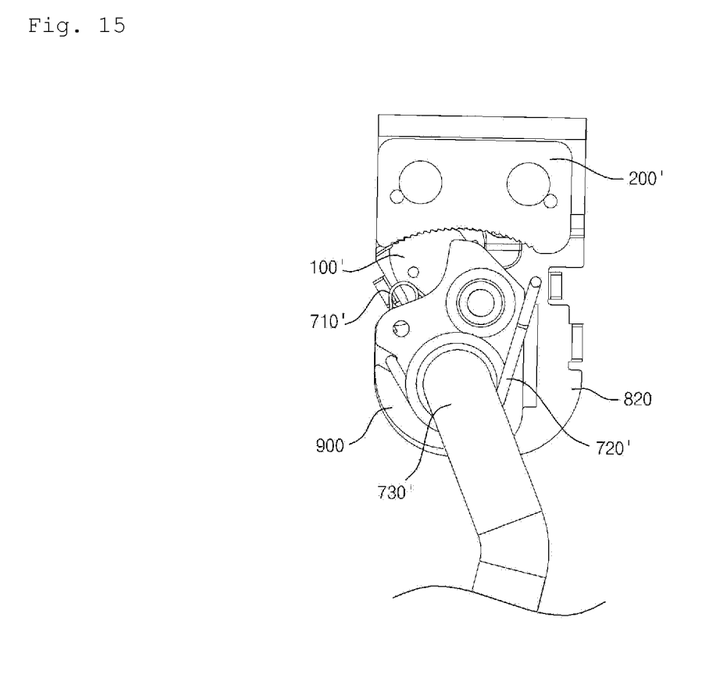
FIG. 15 illustrates a state in which a sidewall disposed on a right side of a second bracket is removed in FIG. 13.

The sidewall 820 disposed on the left side is provided with a first catch nose 821 in the front thereof, a second catch 822 on which the first catch 140' of the first gear 100' is caught at a rear upper portion thereof, and a second catch nose 823 at a rear lower portion thereof.

Figure 12:
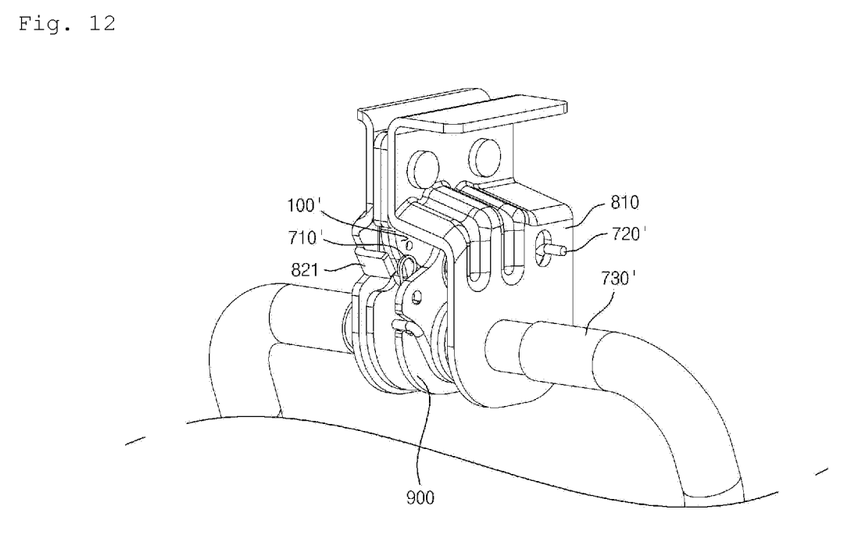
FIG. 12 is an assembled perspective view of the headrest moving device of FIG. 11.
Figure 13:
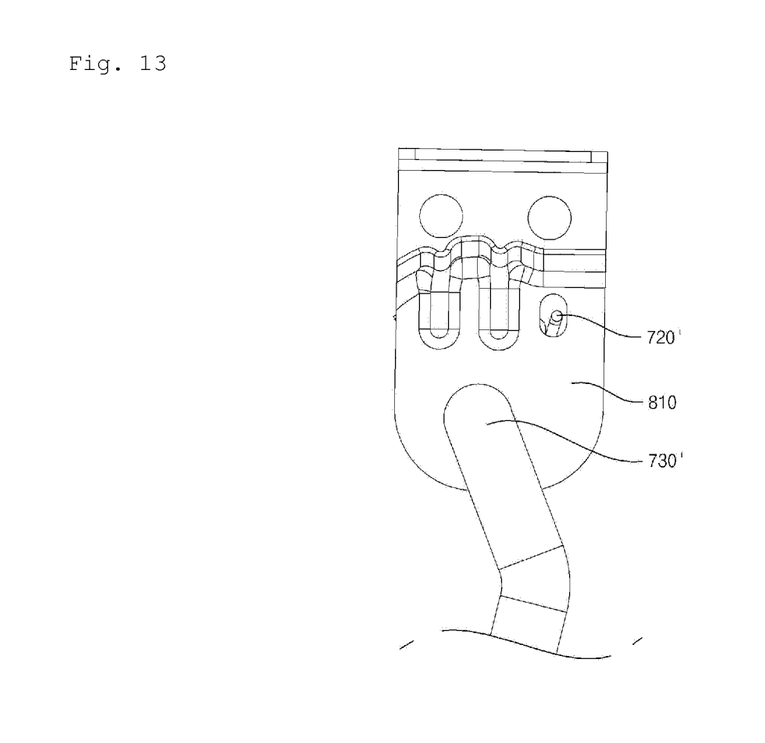
FIG. 13 is a side view of FIG. 12.
Figure 14:
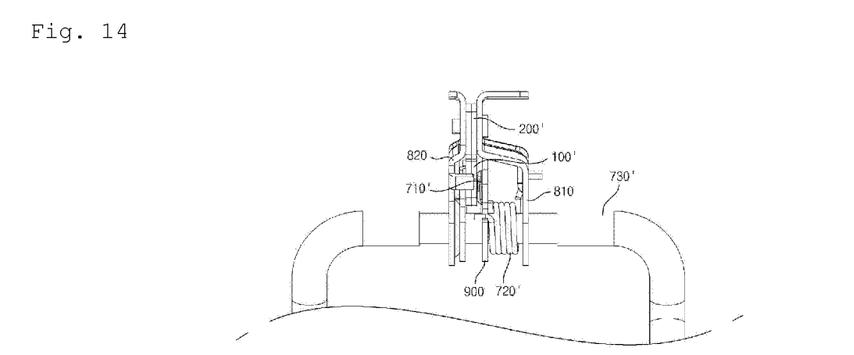
FIG. 14 is a front view of FIG. 12.

When assembled, the second gear 200' is disposed between an upper portion of the left sidewall 820 of the second bracket 800 and an upper portion of the right sidewall 810 of the second bracket 800, and the first gear 100' is disposed between an upper portion of the left sidewall 920 of the first bracket 900 and an upper portion of the right sidewall 910 of the first bracket 900.

Further, the left sidewall 820 of the second bracket 800, the left sidewall 920 of the first bracket 900, the right sidewall 910 of the first bracket 900, the main spring 720', and the right sidewall 810 of the second bracket 800 are sequentially fitted around the middle of the horizontal rod of the stay rod 730' from the left side.

Hereinafter, an operation of the present embodiment having the aforementioned configuration will be described.

Figure 16:
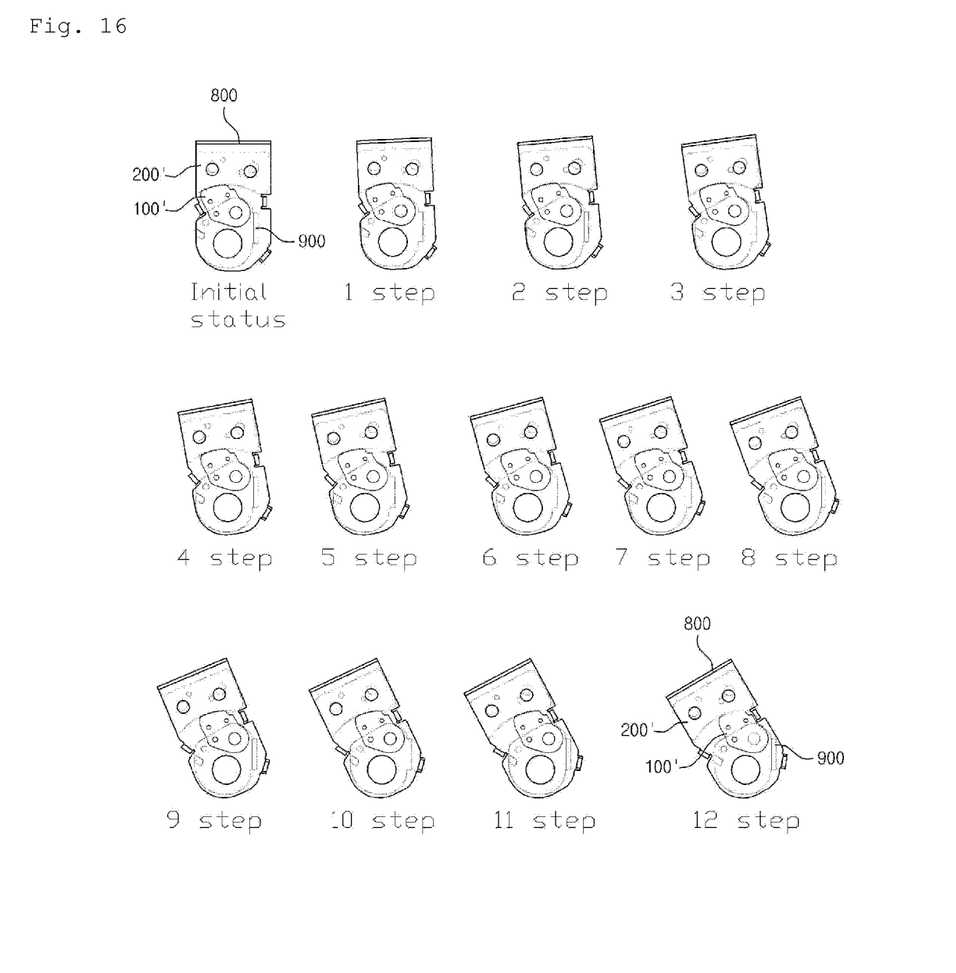
FIG. 16 illustrates an operation of the headrest moving device according to the second embodiment of the present invention.

As illustrated in FIG. 16, when a user pushes forward the headrest in order to tilt the headrest in a forward direction, the headrest (the second gear and the second bracket) is tilted forwards relative to the stay rod 730' (the first gear and the first bracket), because the teeth 150' and 240' are formed to allow the second gear 200' to move forward relative to the first gear 100'. When the user removes a force pushing forward the headrest when the headrest reaches a desired position, the first and second gears 100' and 200' are engaged, and the engaged state is stably maintained by the spring 710'. Thus, a position of the headrest is fixed.

When the user pushes the headrest to the foremost position in order to move the headrest in a backward direction, the first catch 140' of the first gear 100' is caught on the second catch 822 of the second bracket 800, and the first gear 100' is turned. Thereby, the first gear 100' is disengaged from the second gear 200'. The disengaged state of the first and second gears 100' and 200' is maintained by the spring 710'. As such, the headrest including the second bracket 800 and the second gear 200' moves backward relative to the stay rod 730' including the first bracket 900 and the first gear 100' due to an elastic force of the main spring 720'. When the second bracket 800 moves to the rearmost position, the first gear 100' is caught on the first catch nose 821, and is engaged with the front of the second gear 200'.

Although exemplary embodiments of the present invention have been described for illustrative purposes, those skilled in the art will appreciate that various modifications, additions and substitutions are possible, without departing from the scope and spirit of the invention as disclosed in the accompanying claims.

DESCRIPTION OF SYMBOLS

100: first gear
200: second gear 100a, 200a: plate
150, 240: tooth
300: first link
400: second link
500: third link
600: fourth link
710: spring
720: main spring
730: stay rod

The invention claimed is:

1. A headrest moving device comprising:
a first gear having numerous teeth formed in widthwise and lengthwise directions;
a second gear having numerous teeth formed in the widthwise and lengthwise directions,
wherein one of the first and second gears is connected to a seat, and the other is connected to a headrest, and
when the first and second gears are engaged, the numerous widthwise teeth are engaged, and the numerous lengthwise teeth are engaged,
wherein at least one of the first and second gears includes multiple plates, each of which has the numerous teeth formed in the lengthwise direction and which are coupled to form rows of the teeth in the widthwise direction;
a first bracket installed on a horizontal rod connected to the seat; and
a second bracket that is pivotably installed on the horizontal rod and is connected to the headrest,
wherein the first gear is pivotably installed on the first bracket,
the second gear is installed on the second bracket;
the first bracket and the first gear are connected to opposite ends of a spring that keeps the first and second gears engaged or disengaged.

* * * * *